(12) United States Patent
Ji et al.

(10) Patent No.: US 12,470,351 B2
(45) Date of Patent: Nov. 11, 2025

(54) SIDELINK INFORMATION TRANSMISSION METHOD AND TERMINAL DEVICE

(71) Applicant: VIVO MOBILE COMMUNICATION CO., LTD., Dongguan (CN)

(72) Inventors: Zichao Ji, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 439 days.

(21) Appl. No.: 17/864,371

(22) Filed: Jul. 13, 2022

(65) Prior Publication Data

US 2022/0353043 A1   Nov. 3, 2022

Related U.S. Application Data

(63) Continuation of application No. PCT/CN2021/071309, filed on Jan. 12, 2021.

(30) Foreign Application Priority Data

Jan. 15, 2020 (CN) .......................... 202010044326.X (51) Int. Cl.
*H04L 5/00* (2006.01)
*H04W 72/20* (2023.01)

(52) U.S. Cl.
CPC ............ *H04L 5/0053* (2013.01); *H04W 72/20* (2023.01)

(58) Field of Classification Search
CPC ................. H04L 5/0053; H04L 1/1893; H04L 2001/0092; H04L 5/0044; H04L 5/0055; H04L 5/0057; H04L 5/0094; H04L 5/005; H04L 5/0048; H04W 72/20; H04W 72/04–0473; H04W 76/14; H04W 72/54; H04W 24/00; H04W 24/10;
(Continued)

(56) References Cited

U.S. PATENT DOCUMENTS

2016/0066337 A1   3/2016 Sartori et al.
2017/0347394 A1*  11/2017 Yasukawa ............. H04L 1/1896
(Continued)

FOREIGN PATENT DOCUMENTS

CN   106797635 A   5/2017
CN   109644455 A   4/2019
(Continued)

OTHER PUBLICATIONS

3GPP—R1-1812308: Vivo, NR sidelink synchronization mechanism (Year: 2018).*
(Continued)

*Primary Examiner* — Ricky Q Ngo
*Assistant Examiner* — David M Kayal
(74) *Attorney, Agent, or Firm* — IPX PLLC (57) ABSTRACT

A method for sidelink (SL) information transmission and a terminal device, and the method applied to a first terminal device includes: transmitting SL information to a second terminal device on an SL based on a target resource, where the target resource includes a resource in a target resource set or a first resource used to transmit an SL channel measurement reference signal; and receiving feedback information transmitted by the second terminal device, where the feedback information corresponds to the SL information.

19 Claims, 5 Drawing Sheets

(58) Field of Classification Search
CPC ........... H04W 52/00–34; H04W 92/18; H04W 72/40; H04W 28/0875; H04W 76/23; H04B 17/382; H04B 17/309
See application file for complete search history.

(56) References Cited

U.S. PATENT DOCUMENTS

| | | | | |
|---|---|---|---|---|
| 2018/0351723 | A1* | 12/2018 | Feng | .................. H04W 56/001 |
| 2019/0116608 | A1 | 4/2019 | Kim et al. | |
| 2021/0211239 | A1* | 7/2021 | Fan | ..................... H04L 49/9057 |
| 2021/0307062 | A1* | 9/2021 | Tang | .................. H04W 72/121 |
| 2022/0015103 | A1* | 1/2022 | Peng | ................. H04W 72/0453 |
| 2022/0248454 | A1* | 8/2022 | Lee | ....................... H04W 72/23 |
| 2022/0272717 | A1* | 8/2022 | Chen | ..................... H04W 72/20 |

FOREIGN PATENT DOCUMENTS

| | | | |
|---|---|---|---|
| CN | 109792594 | A | 5/2019 |
| CN | 110289896 | A | 9/2019 |
| CN | 110381463 | A | 10/2019 |
| CN | 110535611 | A | 12/2019 |
| WO | 2019007182 | A1 | 1/2019 |
| WO | 2019128261 | A1 | 7/2019 |

OTHER PUBLICATIONS

International Search Report issued in corresponding International Application No. PCT/CN2021/071309, mailed Apr. 9, 2021, 5 pages.
Huawei et al, "Bandwidth Parts and Resource Pools for V2X sidelink", R1-1813555, 3GPP TSG RAN WG1 Meeting #95, Nov. 16, 2018, pp. 1-4, 9.
First Office Action issued in related Chinese Application No. 202010044326.X, mailed Nov. 30, 2021, 13 pages.
Extended European Search Report issued in related European Application No. 21740644.6, mailed Jan. 3, 2023, 14 pages.
Vivo, "NR sidelink synchronization mechanism", 3GPP TSG RAN WG1 Meeting #95, R1-1812308, Nov. 2018, 8 pages.

* cited by examiner

SIDELINK INFORMATION TRANSMISSION METHOD AND TERMINAL DEVICE

CROSS-REFERENCE TO RELATED APPLICATIONS

This application is a continuation of International Application No. PCT/CN2021/071309 filed Jan. 12, 2021, which claims priority to Chinese Patent Application No. 202010044326.X, filed Jan. 15, 2020. The entire contents of each of the above-referenced applications are expressly incorporated herein by reference.

TECHNICAL FIELD

The present disclosure relates to the communications field, and in particular, to a method for sidelink information transmission and a terminal device.

BACKGROUND

Figure 1:
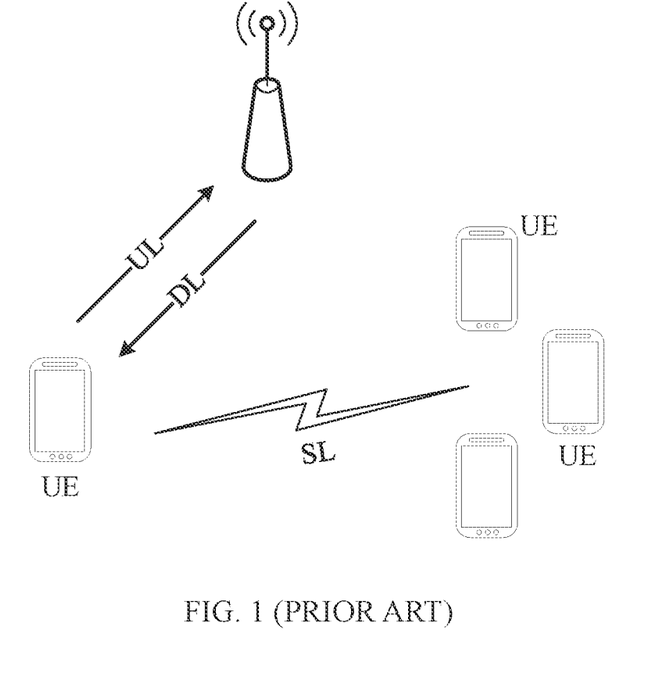
FIG. 1 is a schematic diagram of sidelink information transmission.

Currently, a New Radio (NR) mobile communications system supports Sidelink (SL) transmission, as shown in FIG. 1. NR SL supports high-frequency transmission, for example, a millimeter-wave band (that is, an FR2 band, and a frequency range is 24.25 GHz to 52.6 GHz). However, existing NR SL information transmission has problems of a limited coverage area and limited spectrum utilization of high-frequency transmission, and consequently, transmission efficiency of SL information is low.

SUMMARY

According to a first aspect, an embodiment of the present disclosure provides a method for sidelink (SL) information transmission, where the method is applied to a first terminal device, and the method includes:
transmitting SL information to a second terminal device on an SL based on a target resource, where the target resource includes a resource in a target resource set or a first resource used to transmit an SL channel measurement reference signal; and receiving feedback information transmitted by the second terminal device, where the feedback information corresponds to the SL information.

According to a second aspect, an embodiment of the present disclosure provides a terminal device, where the terminal device includes:
a sending module, configured to transmit SL information to a second terminal device on an SL based on a target resource, where the target resource includes a resource in a target resource set or a first resource used to transmit an SL channel measurement reference signal; and a receiving module, configured to receive feedback information transmitted by the second terminal device, where the feedback information corresponds to the SL information.

According to a third aspect, an embodiment of the present disclosure provides a terminal device, including a processor, a memory, and a computer program that is stored in the memory and that can run on the processor, and when the computer program is executed by the processor, steps of the method in the first aspect are implemented.

According to a fourth aspect, an embodiment of the present disclosure provides a non-transitory computer-readable storage medium, where the non-transitory computer-readable storage medium stores a computer program, and when the computer program is executed by a processor, steps of the method in the first aspect are implemented.

According to a fifth aspect, an embodiment of the present disclosure provides a method for sidelink information transmission, where the method is applied to a second terminal device, and the method includes:
receiving SL information transmitted by a first terminal device on an SL based on a target resource, where the target resource includes a resource in a target resource set or a first resource used to transmit an SL channel measurement reference signal; and transmitting feedback information to the first terminal device, where the feedback information corresponds to the SL information.

According to a sixth aspect, an embodiment of the present disclosure provides a terminal device, where the terminal device includes:
a receiving module, configured to receive SL information transmitted by a first terminal device on an SL based on a target resource, where the target resource includes a resource in a target resource set or a first resource used to transmit an SL channel measurement reference signal; and a sending module, configured to transmit feedback information to the first terminal device, where the feedback information corresponds to the SL information.

According to a seventh aspect, an embodiment of the present disclosure provides a terminal device, including a processor, a memory, and a computer program that is stored in the memory and that can run on the processor, and when the computer program is executed by the processor, steps of the method provided in the second aspect are implemented.

According to an eighth aspect, an embodiment of the present disclosure provides a non-transitory computer-readable storage medium, where the non-transitory computer-readable storage medium stores a computer program, and when the computer program is executed by a processor, steps of the method in the second aspect are implemented.

BRIEF DESCRIPTION OF DRAWINGS

The accompanying drawings described herein are used to provide a further understanding of the present disclosure and constitute a part of the present disclosure. The exemplary embodiments of the present disclosure and descriptions thereof are used to explain the present disclosure, and do not constitute an undue limitation on the present disclosure. In the accompanying drawings.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art fall within the protection scope of the present disclosure.

Technical solutions of the present disclosure may be applied to various communications systems, for example, a Global System of Mobile communication (GSM), a Code Division Multiple Access (CDMA) system, Wideband Code Division Multiple Access (WCDMA), a General Packet Radio Service (GPRS), Long Term Evolution Advanced (LTE-A), and NR.

User-end UE may also be referred to as a mobile terminal or mobile user equipment, and may communicate with one or more core networks by using a Radio Access Network (RAN). The user equipment may be a terminal device, such as a mobile phone (or referred to as a "cellular" phone) and a computer having a mobile terminal. For example, the user equipment may be a portable, pocket-sized, handheld, computer-built-in, or in-vehicle mobile apparatus, and exchange language and/or data with the radio access network.

A network device may also be referred to as a base station, and may be a Base Transceiver Station (BTS) in GSM or CDMA, or may be a NodeB in WCDMA, or may be an evolutional Node B (eNB or e-NodeB) and a 5G base station (gNB) in LTE.

In embodiments of the present disclosure, a process of obtaining Channel State Information (CSI) may generally include: For sending of an SL CSI Reference Signal (CSI-RS), transmitter UE may configure a CSI-RS-related parameter for receiver UE, and sending of the CSI-RS needs to be limited to sending of a Physical Sidelink Shared Channel (PSSCH), and is aperiodic sending. For reporting of SL CSI, a reporting resource is independently selected by the receiver UE or allocated by a base station, and is not configured by the transmitter UE. A type of an SL CSI reporting parameter is fixed reporting of a Rank Indicator (RI) and a Channel Quality Indicator (CQI), and is aperiodic reporting.

The technical solutions provided in the embodiments of the present disclosure are described in detail below with reference to the accompanying drawings.

Figure 2:
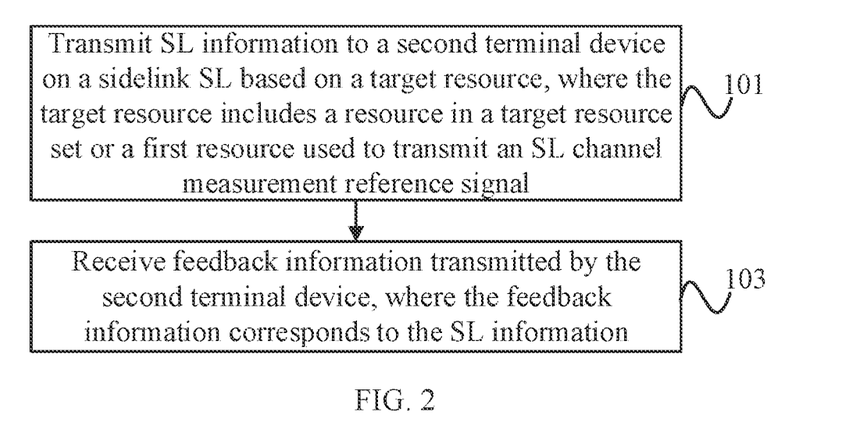
FIG. 2 is a schematic flowchart of a method for sidelink information transmission according to an embodiment of the present disclosure.

As shown in FIG. 2, an embodiment of the present disclosure provides a method for sidelink information transmission. The method is performed by a first terminal device, that is, a transmitter terminal device on an SL. The method includes the following procedure steps:

Step 101: Transmit SL information to a second terminal device on a sidelink (SL) based on a target resource, where the target resource includes a resource in a target resource set or a first resource used to transmit an SL channel measurement reference signal.

Step 103: Receive feedback information transmitted by the second terminal device, where the feedback information corresponds to the SL information.

In this embodiment of the present disclosure, when the first terminal device and the second terminal device perform information exchange transmission by using an SL, an SL resource allocation manner can be enriched by providing insurance for the establishment of a reliable communication link between the first terminal device and the second terminal device by using a dedicated resource set, that is, a group of resources, or by using an available resource that has provided for a reliable communication link for information exchange between the first terminal device and the second terminal device, that is, the first resource used to transmit the SL channel measurement reference signal. Further, the SL information may be effectively and reliably transmitted to the second terminal device by using a target resource in any one of the foregoing forms, so that information exchange transmission with the second terminal device is successfully implemented after the feedback information corresponding to the SL information is received, and corresponding information exchange may be implemented based on the specific content of the feedback information. In this way, sidelink information transmission efficiency can be improved, and a phenomenon that a coverage area and spectrum utilization of high-frequency transmission are limited is effectively improved.

In some embodiments, in the method for sidelink information transmission in this embodiment of the present disclosure, the feedback information may be used to implement at least one of the following objectives:

(1) Obtain an SL channel state. For example, in a case that the feedback information includes Channel State Information (CSI), a corresponding channel state may be obtained based on received CSI.

(2) Perform SL beam alignment to determine an SL transmit beam and an SL receive beam. For example, in a case that the feedback information includes a measurement result obtained based on corresponding SL reference information, SL beam alignment may be implemented based on the measurement result. In other words, in this embodiment of the present disclosure, a beam alignment procedure on the SL may be implemented, and a problem that beam alignment cannot be implemented based on S-SSB scanning because whether the terminal device sends the S-SSB cannot be determined due to a reason that sending of a Sidelink Synchronization Signal and PBCH block (S-SSB) is limited by specific event triggering.

(3) Perform power control, that is, transmit power of an information sender in the sidelink communication, that is, the first terminal device, is further adjusted, so that it can always be ensured that a receiver, that is, the second terminal device, can receive, with a better receiving effect, information or a signal sent by the information sender. In this way, power waste can be reduced, and overall performance of a communication system can be improved. In this case, the feedback information may include at least one of a Hybrid Automatic Repeat Request (HARQ) Acknowledgement/Negative Acknowledgement (ACK/NACK), a CQI, a Signal to Interference plus Noise Ratio (SINR), or a Block Error Rate (BLER).

It should be noted that an objective that can be implemented by the feedback information includes but is not limited to the foregoing content, and may further include SL beam management, SL beam failure detection, SL beam failure recovery, quasi-co-location relationship setting, and the like.

Figure 3:
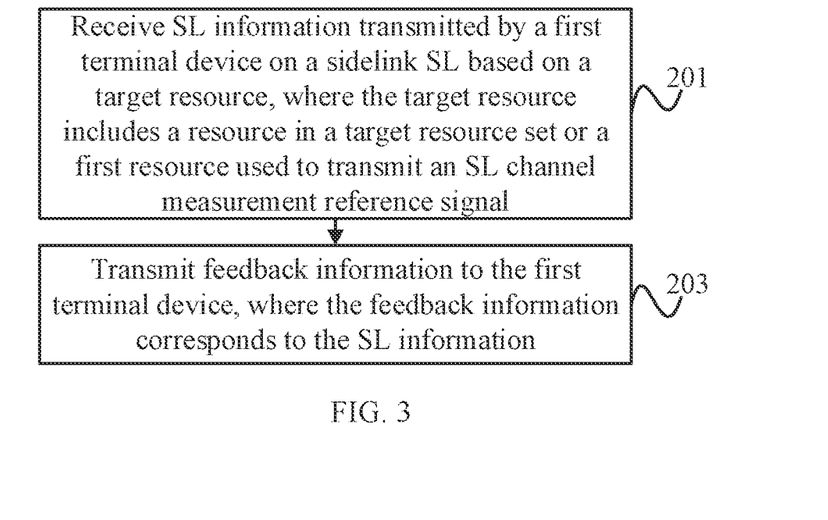
FIG. 3 is a schematic flowchart of another method for sidelink information transmission according to an embodiment of the present disclosure.

As shown in FIG. 3, an embodiment of the present disclosure provides a method for sidelink information transmission. The method is performed by a second terminal device, that is, a receiver terminal device on an SL. The method includes the following procedure steps:

Step 201: Receive SL information transmitted by a first terminal device on a sidelink SL based on a target resource, where the target resource includes a resource in a target resource set or a first resource used to transmit an SL channel measurement reference signal.

Step 203: Transmit feedback information to the first terminal device, where the feedback information corresponds to the SL information.

In this embodiment of the present disclosure, when the second terminal device performs information exchange transmission with the first terminal device by using the sidelink SL, the SL information transmitted by the first terminal device based on the target resource may be received. The target resource may include a resource set, that is, a group of resources, dedicated by the first terminal device to establish a reliable communication link with the second terminal device, or may further include an available resource that has provided a reliable communication link for information exchange between the first terminal device and the second terminal device, that is, the first resource used to transmit the SL channel measurement reference signal, and transmit the feedback information corresponding to the SL information to the first terminal device, to successfully implement information exchange transmission with the first terminal device, and to further implement corresponding information exchange based on specific content of the feedback information. In this way, sidelink information transmission efficiency can be improved, and a phenomenon that a coverage area and spectrum utilization of high-frequency transmission are limited is effectively improved.

In some embodiments, in the method for sidelink information transmission in this embodiment of the present disclosure, the feedback information may be at least one of the following:

(1) CSI. When the feedback information includes the CSI, an SL channel state can be obtained.

(2) A measurement result obtained based on corresponding SL reference information. When the feedback information includes a corresponding measurement result, SL beam alignment may be performed to determine an SL transmit beam and an SL receive beam. In other words, in this embodiment of the present disclosure, a beam alignment procedure on the SL may be implemented, and a problem that beam alignment cannot be implemented based on S-SSB scanning because whether the terminal device sends the S-SSB cannot be determined due to a reason that sending of an S-SSB is limited by specific event triggering.

(3) At least one of a HARQACK/NACK, a CQI, an SINR, or a BLER. When the feedback information includes the foregoing information, power control can be implemented, that is, transmit power of an information sender in the sidelink communication, that is, the first terminal device is further adjusted, so that it can always be ensured that a receiver, that is, the second terminal device, can receive, with a better receiving effect, information or a signal sent by the information sender. In this way, power waste can be reduced, and the overall performance of a communication system can be improved.

It should be noted that the feedback information includes but is not limited to the foregoing content, and may further include SL beam management, SL beam failure detection, SL beam failure recovery, quasi-co-location relationship setting, and the like.

In some embodiments, in the method for sidelink information transmission in this embodiment of the present disclosure, an information exchange process between the first terminal device and the second terminal device is also different based on different composition of target resources. The following describes the information exchange process with reference to different specific embodiments.

Specific Embodiment 1

In this specific embodiment 1, the target resource includes a resource in the target resource set, and there are one or more resources in the target resource set. The resource in the target resource set is a sending resource dedicated by a sender, that is, the first terminal device, to transmit SL information.

In some embodiments, the target resource set is a set of time domain units, including a slot set, a sub-slot set, an S-SSB set, a Physical Sidelink Control Channel (PSCCH) resource set, a Physical Sidelink Share Channel (PSSCH) resource set, and the like.

In some embodiments, in this specific embodiment 1, in a case that there are multiple resources in the target resource set, the multiple resources have a same resource block size.

It should be noted that, in another embodiment of the method for sidelink information transmission in the present disclosure, in a case that there are multiple resources in the target resource set, the multiple resources may alternatively have different resource block sizes.

In some embodiments, in this specific embodiment 1, in a case that there are multiple resources in the target resource set, the multiple resources are consecutive. For example, the multiple resources are in consecutive logical slots or sub-slots, or in consecutive physical slots or sub-slots.

It should be noted that, in another embodiment of the method for sidelink information transmission in the present disclosure, in a case that there are multiple resources in the target resource set, the multiple resources may alternatively be non-consecutive.

In some embodiments, in this specific embodiment 1, the SL information includes an SL measurement reporting configuration parameter. The SL measurement reporting configuration parameter includes at least one of the following: a reporting triggering identifier, a reporting type, or a reporting resource. That the SL information includes the SL measurement reporting configuration parameter may be specified in a protocol, preconfigured, or configured by a control node.

In some embodiments, the SL measurement reporting configuration parameter may be carried in Sidelink Control Information (SCI) in different stages, for example, 1st SCI or 2nd SCI.

In some embodiments, in this specific embodiment 1, the SL information may further include an SL reference signal, and the SL reference signal includes at least one of a Sidelink Synchronization Signal (SL-SS), a Demodulation Reference Signal (DMRS), or a channel state information reference signal (CSI-RS).

In some embodiments, in this specific embodiment 1, the target resource set may be determined in different manners.

Manner 1

In some embodiments, in the manner 1, the target resource set is specified in a protocol, preconfigured, or configured by a control node.

In some embodiments, in a case that the target resource set is preconfigured or configured by a control node, the target resource set is configured or preconfigured by using Radio Resource Control (RRC) signaling.

Figure 4:
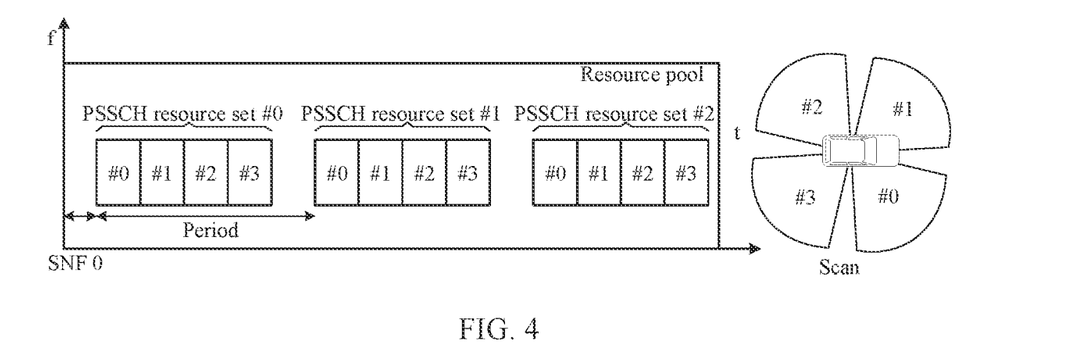
FIG. 4 is a schematic diagram of a PSSCH resource set according to an embodiment of the present disclosure.

For example, a PSSCH resource set shown in FIG. 4 may be configured by the control node, and is a periodic resource. There is an offset value relative to a system frame number SFN0, and each PSSCH resource set includes four PSSCH resources. Each PSSCH resource index may be indicated in a PSCCH corresponding to a PSSCH. #0, #1, #2, and #3 shown in the figure are PSSCH resource indexes.

In some embodiments, the target resource set determined in the manner 1 and a target sidelink synchronization signal block S-SSB are in a frequency division multiplexing or time division multiplexing relationship, and a transmission manner corresponding to the target S-SSB is different from a transmission manner corresponding to each resource in the target resource set. The target S-SSB includes an S-SSB transmitted based on an existing transmission manner, for example, Rel-15 NR SL SSB.

In some embodiments, the first terminal device that determines the target resource set based on the manner 1 may be specified in a protocol, preconfigured, or configured by a network device. The first terminal device may include a group header of a group of terminal devices, a terminal device responsible for scheduling, and UE or relay UE whose type is a Road Side Unit (RSU).

Further, different parameters of the target resource set determined based on the manner 1 may also be determined in different manners.

In some embodiments, a first configuration parameter related to the target resource set is determined in a manner of being specified in a protocol, being preconfigured, or being configured by a network device.

The first configuration parameter includes at least one of the following: a period corresponding to the target resource set; an offset corresponding to the target resource set; a length or a quantity of time domain transmission units corresponding to the target resource set, where the time domain transmission unit is related to a specific case of a resource included in the target resource set, for example, if a resource in the target resource set is a slot, the time domain transmission unit is the slot, and in some embodiments, the time domain transmission unit may be a slot, a sub-slot, a beam, an S-SSB, or the like; or a frequency domain resource configuration parameter corresponding to the target resource set, where the frequency domain resource configuration parameter may include but is not limited to a length and a start location of a frequency domain resource.

In some embodiments, a second configuration parameter related to the target resource set is determined in a manner of being indicated by physical layer signaling.

The second configuration parameter includes at least one of the following: an index corresponding to the target resource set, where the index is used to identify the target resource set; an indicator corresponding to the target resource set, where the indicator is used to indicate that the SL transmission is performed based on the target resource set; or an index corresponding to each resource in the target resource set.

Manner 2

In some embodiments, in the manner 2, the target resource set is determined based on the selection of the first terminal device or scheduling of a control node.

Figure 5:
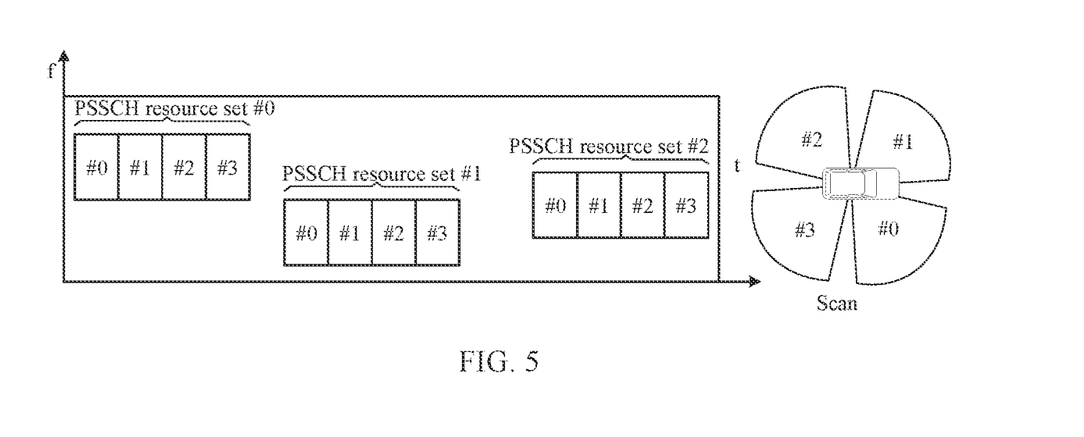
FIG. 5 is a schematic diagram of another PSSCH resource set according to an embodiment of the present disclosure.

For example, a PSSCH resource set shown in FIG. 5 may be determined by the first terminal device based on an independent selection, and each PSSCH resource set includes four PSSCH resources. Each PSSCH resource index may be indicated in a PSCCH corresponding to a PSSCH. #0, #1, #2, and #3 shown in the figure are PSSCH resource indexes.

In some embodiments, in this embodiment, there are multiple resources in the target resource set selected by the first terminal device, and when the multiple resources have a same resource block size and are consecutive, the group of resources corresponding to the target resource set may be used as candidate resources.

In some embodiments, a related configuration of the target resource set determined based on the manner 2 may be specified in a protocol, preconfigured, or configured by a control node.

The related configuration of the target resource set may include at least one of the following: a frequency domain resource size; a value range of a frequency domain resource size; a maximum value of a frequency domain resource size; a minimum value of a frequency domain resource size; a quantity of time domain units; a value range of a quantity of time domain units; a maximum value of a quantity of time domain units; or a minimum value of a quantity of time domain units.

It may be understood that by configuring the foregoing time/frequency domain size related parameters of the target resource set, a case in which a user occupies excessive resources can be avoided.

It should be noted that in this embodiment of the present disclosure, the related configuration of the target resource set may further include a manner determined by the first terminal device in addition to a manner specified in a protocol, preconfigured, or configured by a control node.

In some embodiments, a third configuration parameter related to the target resource set is determined in a manner of being indicated by physical layer signaling.

The third configuration parameter includes at least one of the following: a period corresponding to the target resource set; a length or a quantity of time domain transmission units corresponding to the target resource set, where the time domain transmission unit is related to a specific case of a resource included in the target resource set, for example, if a resource in the target resource set is a slot, the time domain transmission unit is the slot, and in some embodiments, the time domain transmission unit may be a slot, a sub-slot, a beam, a pre-coder, a panel, an S-SSB, or the like; an index corresponding to the target resource set, where the index is used to identify the target resource set; an indicator corresponding to the target resource set, where the indicator is used to indicate that the SL transmission is performed based on the target resource set; or an index corresponding to each resource in the target resource set.

In this specific embodiment 1, steps in which the first terminal device transmits the SL information based on the target resource set may be implemented based on different solutions.

Solution 1

In some embodiments, in the solution 1, a mapping relationship between SL information transmission corresponding to each resource in the target resource set and a precoding matrix is specified in a protocol, preconfigured, or configured by a control node.

In this embodiment, a transmission direction of SL information corresponding to each resource in the target resource set may be determined in multiple manners, to send the SL information. In some embodiments, the transmission direction is determined by using a mapping relationship between the SL information and a precoding matrix or an antenna panel.

Solution 2

In some embodiments, in the solution 2, that transmission of SL information on resources corresponding to multiple target resource sets is Quasi co-located (QCL) or not quasi co-located is specified in a protocol, preconfigured, or configured by a control node. For example, for multiple target resource sets, the first resource in one resource set is quasi-co-located with the first resource in another resource set. The first resources in the two resource sets are quasi-co-located with the second resource in the other resource set; and so on.

Solution 3

In some embodiments, in solution 3, step 101 may be performed as the following content:

SL information transmitted on the SL to the second terminal device based on resources in the target resource set includes same data.

In this embodiment, the first terminal device may be configured, based on the specification in a protocol, preconfiguration, or configuration of a control node, to perform repeated transmission on the target resource set, for example, PSSCH retransmission.

In some embodiments, the control node may include a network device such as a base station or another terminal device responsible for scheduling.

In this specific embodiment 1, the second terminal device may receive SL information transmitted by the first terminal device based on any one of the foregoing target resource sets, and then return feedback information corresponding to the SL information.

In some embodiments, in this specific embodiment 1, step 203 may be performed as the following content:

transmitting feedback information to the first terminal device based on a reporting resource set, where there are one or more resources in the reporting resource set.

In some embodiments, the reporting resource set includes a Physical Sidelink Feedback Channel (PSFCH) resource set, which may be each PSFCH associated with a PSSCH.

In some embodiments, the reporting resource set includes a PSCCH resource set.

In some embodiments, the reporting resource set includes a PSSCH resource set.

In some embodiments, in an example, a resource in the reporting resource set may be indicated by the first terminal device by using the SL measurement reporting configuration parameter.

In some embodiments, in another example, the reporting resource set is determined based on the selection of the second terminal device or scheduling of a control node. For details, reference may be made to a related determining process of the target resource set used by the first terminal device to send the SL information. Details are not described herein again.

In some embodiments, in still another example, the reporting resource set is specified in a protocol, preconfigured, or configured by a control node. For details, reference may be made to a related determining process of the target resource set used by the first terminal device to send the SL information. Details are not described herein again.

Correspondingly, for the first terminal device, step 103 may be performed as the following content:

receiving feedback information transmitted by the second terminal device based on the reporting resource set.

In some embodiments, in this specific embodiment 1, in a case that the feedback information includes a measurement result, the measurement result includes a target measurement result value and an indication parameter that are corresponding to at least one resource in the target resource set. The target measurement result value is the largest in all measurement result values corresponding to resources in the target resource set. The indication parameter includes at least one of a hypothesis factor, a target frame number (such as an SFN or a DFN), or a set index, that is, an index of a corresponding resource, slot, sub-slot, or beam.

Further, the feedback information may further include a pre-coder index, a panel index, an S-SSB index, a QCL hypothesis factor, a logical/physical (sub-)slot index, and the like.

The measurement result may include at least one of Reference Signal Received Power (RSRP), Reference Signal Received Quality (RSRQ), Received Signal Strength Indication (RSSI), or an SINR.

Specific Embodiment 2

In this specific embodiment 2, the target resource is a first resource used to transmit an SL channel measurement reference signal. Correspondingly, the SL information includes a channel state information reference signal. The feedback information includes channel state information CSI.

It may be understood that in this embodiment, by reusing a CSI obtaining procedure, the sidelink information in this embodiment of the present disclosure is transmitted.

In some embodiments, in this specific embodiment 2, for the first terminal device, in addition to transmitting the SL information to the second terminal device based on the target resource, the following content may be further performed:

transmitting target signaling to the second terminal device based on a second resource.

In some embodiments, the target signaling includes at least one of CSI resource configuration signaling, CSI reporting configuration signaling, CSI triggering state configuration signaling, or CSI triggering signaling.

Correspondingly, for the second terminal device, in addition to receiving the SL information sent by the first terminal device based on the target resource, the following content may be correspondingly performed:

receiving the target signaling transmitted by the first terminal device based on the second resource.

In some embodiments, the target signaling includes at least one of CSI resource configuration signaling, CSI reporting configuration signaling, CSI triggering state configuration signaling, or CSI triggering signaling.

Further, in this specific embodiment 2, for the second terminal device, the following content may be performed in step 203:

transmitting feedback information to the first terminal device based on a third resource.

In some embodiments, a frequency band on which at least one of the third resource, the second resource, or the first resource is located is specified in a protocol, preconfigured, or configured by a control node. The frequency band includes a Physical Resource Block set (PRB set), a Bandwidth Part (BWP), a carrier, a bandwidth, or a resource pool.

In some embodiments, the feedback information carries a target indication field, and the target indication field is used to indicate an index of a frequency band on which at least one of the third resource, the second resource, or the first resource is located. It may be understood that, for a receiver, that is, the second terminal device, the feedback information may be used to indicate the index of the frequency band on which at least one of the third resource, the second resource, or the first resource is located.

Correspondingly, for the first terminal device, the following content may be further performed:

receiving feedback information transmitted by the second terminal device based on a third resource.

In some embodiments, a frequency band on which at least one of the third resource, the second resource, or the first resource is located is specified in a protocol, preconfigured, or configured by a control node. The frequency band includes a Physical Resource Block set (PRB set), a Bandwidth Part (BWP), a carrier, a bandwidth, or a resource pool.

In some embodiments, the target signaling carries a target indication field, and the target indication field is used to indicate an index of a frequency band on which at least one of the third resource, the second resource, or the first resource is located. It may be understood that, for a sender, that is, the first terminal device, the target signaling may be used to indicate the index of the frequency band on which at least one of the third resource, the second resource, or the first resource is located.

In some embodiments, in an example, the second resource may be different from the first resource.

Figure 6:
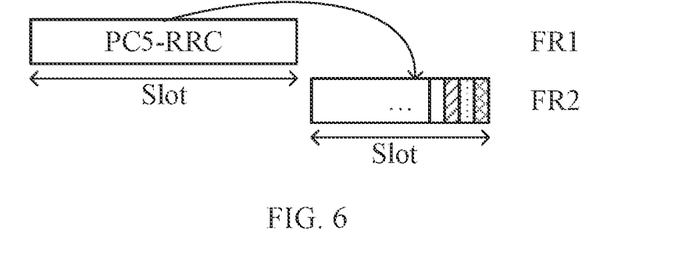
FIG. 6 is a schematic diagram of sidelink information transmission that reuses a CSI obtaining procedure according to an embodiment of the present disclosure.
Figure 7:
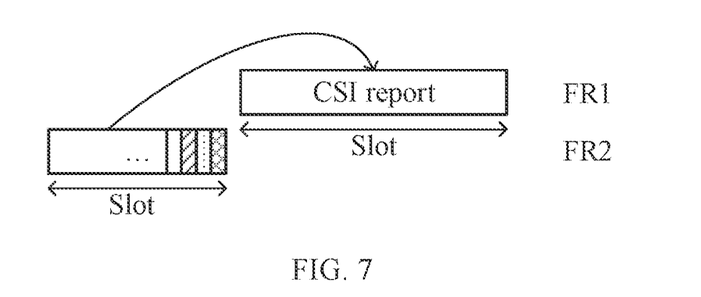
FIG. 7 is a schematic diagram of another type of sidelink information transmission that reuses a CSI obtaining procedure according to an embodiment of the present disclosure.

For example, as shown in FIG. 6 and FIG. 7, in a carrier aggregation manner, two carriers are configured in the system: One carrier is on an FR1 frequency band and the other carrier is on an FR2 frequency band. The system configures a carrier (that is, the first resource) of the FR1 frequency band to transmit control signaling (CSI resource configuration and CSI reporting configuration information) and CSI, and a carrier (that is, the second resource) of the FR2 frequency band to transmit CSI-RS. As shown in FIG. 6, RX UE (that is, the second terminal device) listens to the carrier of the FR1 frequency band, and obtains, by demodulating PC5-RRC, CSI-RS-related configuration information sent by TX UE (that is, the first terminal device). As shown in FIG. 7, the RX UE performs CSI measurement on the carrier of the FR2 frequency band, and reports CSI of the carrier of the FR2 frequency band to the TX UE on the carrier of the FR1 frequency band after measurement.

In some embodiments, in another example, the second resource may be the same as the first resource.

Figure 8:
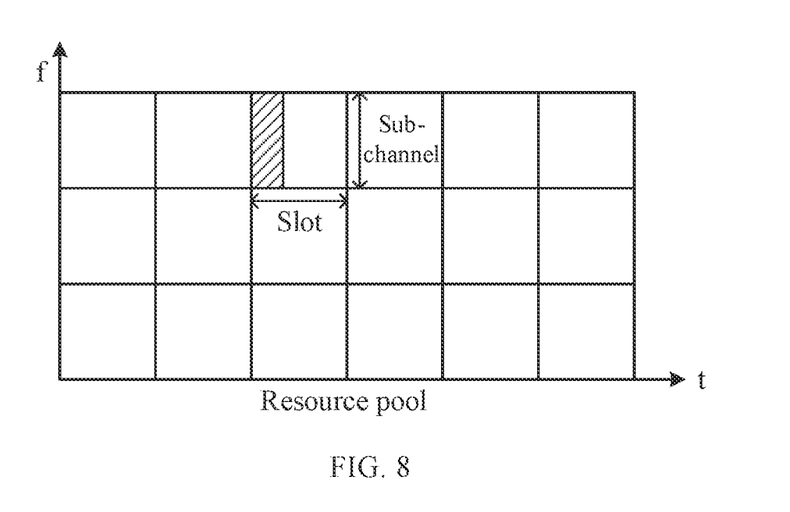
FIG. 8 is a schematic diagram of a basic transmission unit of CSI reporting trigger signaling according to an embodiment of the present disclosure.

In some embodiments, in a case that the target signaling includes CSI triggering signaling, a second resource corresponding to the CSI triggering signaling is fixed in size, and is specified in a protocol, preconfigured, or configured by a control node, as shown in FIG. 8.

The size of the second resource corresponding to the CSI triggering signaling includes one of the following: one or more subchannels; one or more physical resource blocks PRBs; one or more slots; one or more sub-slots; and one or more standalone physical sidelink control channels (PSCCH), where the PSCCH may be sent independently.

In some embodiments, in this specific embodiment 2, for the second terminal device, step 203 may be performed as the following content:

transmitting feedback information to the first terminal device based on a reporting resource set, where there are one or more resources in the reporting resource set.

In some embodiments, the reporting resource set includes a PSFCH resource set, which may be each PSFCH associated with a PSSCH.

In some embodiments, the reporting resource set includes a PSCCH resource set.

In some embodiments, the reporting resource set includes a PSSCH resource set.

In some embodiments, in an example, a resource in the reporting resource set may be indicated by the first terminal device by using the SL measurement reporting configuration parameter.

In some embodiments, in another example, the reporting resource set is determined based on selection of the second terminal device or scheduling of a control node. For details, reference may be made to a related determining process of the target resource set used by the first terminal device to send the SL information. Details are not described herein again.

In some embodiments, in still another example, the reporting resource set is specified in a protocol, preconfigured, or configured by a control node. For details, reference may be made to a related determining process of the target resource set used by the first terminal device to send the SL information. Details are not described herein again.

Correspondingly, for the first terminal device, step 103 may be performed as the following content:

receiving feedback information transmitted by the second terminal device based on the reporting resource set.

In some embodiments, in this specific embodiment 2, in a case that the feedback information includes a measurement result, the measurement result includes a target measurement result value and an indication parameter that are corresponding to at least one resource in the target resource set. The target measurement result value is the largest in all measurement result values corresponding to resources in the target resource set. The indication parameter includes at least one of a hypothesis factor, a target frame number, or a set index.

Figure 9:
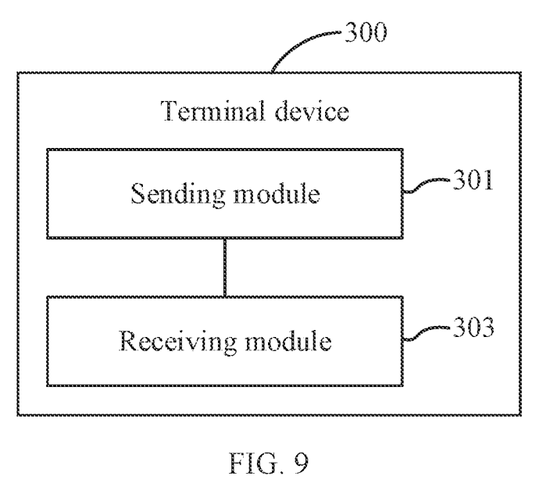
FIG. 9 is a schematic diagram of a structure of a terminal device according to an embodiment of the present disclosure.

As shown in FIG. 9, an embodiment of the present disclosure provides a terminal device 300. The terminal device 300 includes a sending module 301 and a receiving module 303.

The sending module 301 is configured to transmit SL information to a second terminal device on a sidelink SL based on a target resource, where the target resource includes a resource in a target resource set or a first resource used to transmit an SL channel measurement reference signal. The receiving module 303 is configured to receive feedback information transmitted by the second terminal device, where the feedback information corresponds to the SL information.

In some embodiments, in the terminal device 300 in this embodiment of the present disclosure, in a case that the target resource includes a resource in the target resource set, there are one or more resources in the target resource set.

In some embodiments, in the terminal device 300 in this embodiment of the present disclosure, in a case that there are multiple resources in the target resource set, the multiple resources have a same resource block size.

In some embodiments, in the terminal device 300 in this embodiment of the present disclosure, in a case that there are multiple resources in the target resource set, the multiple resources are consecutive.

In some embodiments, in the terminal device 300 in this embodiment of the present disclosure, the target resource set is specified in a protocol, preconfigured, or configured by a control node.

In some embodiments, the terminal device 300 in this embodiment of the present disclosure may further include:

a first configuration module, configured to determine, in a manner of being specified in a protocol, being preconfigured, or being configured by a network device, a first configuration parameter related to the target resource set; where the first configuration parameter includes at least one of the following: a period corresponding to the target resource set; an offset corresponding to the target resource set; a length or a quantity of time domain transmission units corresponding to the target resource set; or a frequency domain resource configuration parameter corresponding to the target resource set.

In some embodiments, in the terminal device 300 in this embodiment of the present disclosure, the first configuration module may be further configured to:

determine, in a manner of being indicated by physical layer signaling, a second configuration parameter related to the target resource set; where the second configuration parameter includes at least one of the following: an index corresponding to the target resource set, where the index is used to identify the target resource set; an indicator corresponding to the target resource set, where the indicator is used to indicate that the SL transmission is performed based on the target resource set; or an index corresponding to each resource in the target resource set.

In some embodiments, in the terminal device 300 in this embodiment of the present disclosure, the target resource set and a target sidelink synchronization signal block S-SSB are in a frequency division multiplexing or time division multiplexing relationship, and a transmission manner corresponding to the target S-SSB is different from a transmission manner corresponding to each resource in the target resource set.

In some embodiments, in the terminal device 300 in this embodiment of the present disclosure, the first terminal device is specified in a protocol, preconfigured, or configured by a network device.

In some embodiments, in the terminal device 300 in this embodiment of the present disclosure, the target resource set is determined based on selection of the first terminal device or scheduling of a control node.

In some embodiments, in the terminal device 300 in this embodiment of the present disclosure, at least one of the following corresponding to the target resource set is specified in a protocol, preconfigured, or configured by a control node: a frequency domain resource size; a value range of a frequency domain resource size; a maximum value of a frequency domain resource size; a minimum value of a frequency domain resource size; a quantity of time domain units; a value range of a quantity of time domain units; a maximum value of a quantity of time domain units; or a minimum value of a quantity of time domain units.

In some embodiments, the terminal device 300 in this embodiment of the present disclosure may further include:

a second configuration module, configured to determine, in a manner of being indicated by physical layer signaling, a third configuration parameter related to the target resource set; where the third configuration parameter includes at least one of the following: a period corresponding to the target resource set; a length or a quantity of time domain transmission units corresponding to the target resource set; an index corresponding to the target resource set, where the index is used to identify the target resource set; an indicator corresponding to the target resource set, where the indicator is used to indicate that the SL transmission is performed based on the target resource set; or an index corresponding to each resource in the target resource set.

In some embodiments, in the terminal device 300 in this embodiment of the present disclosure, a mapping relationship between SL information transmission corresponding to each resource in the target resource set and a precoding matrix is specified in a protocol, preconfigured, or configured by a control node.

In some embodiments, in the terminal device 300 in this embodiment of the present disclosure, the sending module 301 may be further configured to:

SL information transmitted on the SL to the second terminal device based on resources in the target resource set includes same data.

In some embodiments, in the terminal device 300 in this embodiment of the present disclosure, the SL information includes an SL measurement reporting configuration parameter. The SL measurement reporting configuration parameter includes at least one of the following: a reporting triggering identifier, a reporting type, or a reporting resource.

In some embodiments, in the terminal device 300 in this embodiment of the present disclosure, the SL information further includes an SL reference signal, and the SL reference signal includes at least one of a sidelink synchronization signal, a demodulation reference signal, or a channel state information reference signal.

In some embodiments, in the terminal device 300 in this embodiment of the present disclosure, in a case that the target resource is the first resource used to transmit the SL channel measurement reference signal, the SL information includes a channel state information reference signal.

In some embodiments, in the terminal device 300 in this embodiment of the present disclosure, the sending module 301 may be further configured to:

transmit target signaling to the second terminal device based on a second resource, where the target signaling includes at least one of CSI resource configuration signaling, CSI reporting configuration signaling, CSI triggering state configuration signaling, or CSI triggering signaling.

In some embodiments, in the terminal device 300 in this embodiment of the present disclosure, the receiving module 303 may be configured to:

in a case that the feedback information includes channel state information CSI, receive the feedback information transmitted by the second terminal device based on a third resource.

In some embodiments, in the terminal device 300 in this embodiment of the present disclosure, a frequency band on which at least one of the third resource, the second resource, and the first resource is located is specified in a protocol, preconfigured, or configured by a control node.

In some embodiments, in the terminal device 300 in this embodiment of the present disclosure, the target signaling carries a target indication field, and the target indication field is used to indicate an index of a frequency band on which at least one of the third resource, the second resource, or the first resource is located.

In some embodiments, in the terminal device 300 in this embodiment of the present disclosure, in a case that the target signaling includes CSI triggering signaling, a second resource corresponding to the CSI triggering signaling is fixed in size, and is specified in a protocol, preconfigured, or configured by a control node; and the size of the second resource corresponding to the CSI triggering signaling includes one of the following: one or more subchannels; one or more physical resource blocks PRBs; one or more slots; one or more sub-slots; and one or more standalone physical sidelink control channels PSCCH.

It can be understood that the terminal device 300 provided in this embodiment of the present disclosure can implement the sidelink information transmission information performed by the terminal device 300. Related descriptions of sidelink information transmission are applicable to the terminal device 300, and details are not described herein again.

In embodiments of the present disclosure, when the first terminal device and the second terminal device perform information exchange transmission by using the sidelink SL, an SL resource allocation manner can be enriched by providing insurance for establishment of a reliable communication link between the first terminal device and the second terminal device by using a dedicated resource set, that is, a group of resources, or by using an available resource that has provided for a reliable communication link for information exchange between the first terminal device and the second terminal device, that is, the first resource used to transmit the SL channel measurement reference signal. Further, the SL information may be effectively and reliably transmitted to the second terminal device by using a target resource in any one of the foregoing forms, so that information exchange transmission with the second terminal device is successfully implemented after the feedback information corresponding to the SL information is received, and corresponding information exchange may be implemented based on specific content of the feedback information. In this way, sidelink information transmission efficiency can be improved, and a phenomenon that a coverage area and spectrum utilization of high-frequency transmission are limited is effectively improved.

Figure 10:
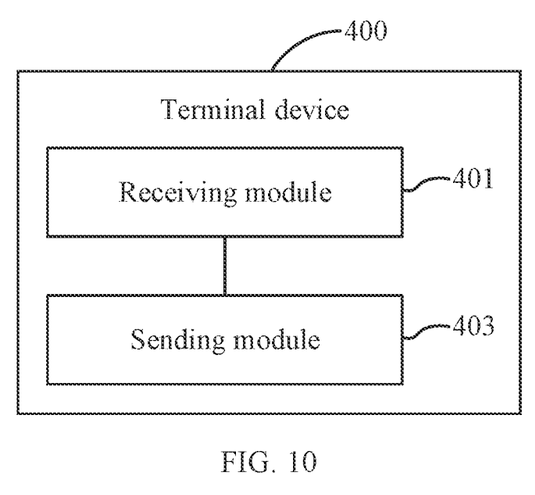
FIG. 10 is a schematic diagram of a structure of another terminal device according to an embodiment of the present disclosure.

As shown in FIG. 10, an embodiment of the present disclosure provides a terminal device 400. The terminal device 400 includes a receiving module 401 and a sending module 403.

The receiving module 401 is configured to receive SL information transmitted by a first terminal device on a sidelink SL based on a target resource, where the target resource includes a resource in a target resource set or a first resource used to transmit an SL channel measurement reference signal. The sending module 403 is configured to transmit feedback information transmitted to the first terminal device, where the feedback information corresponds to the SL information.

In some embodiments, in the terminal device 400 in this embodiment of the present disclosure, the sending module 403 may be configured to:

transmit the feedback information to the first terminal device based on a reporting resource set, where there are one or more resources in the reporting resource set.

In some embodiments, in the terminal device 400 in this embodiment of the present disclosure, the reporting resource set is determined based on selection of a second terminal device or scheduling of a control node, or the reporting resource set is specified in a protocol, preconfigured, or configured by a control node.

In some embodiments, in the terminal device 400 in this embodiment of the present disclosure, in a case that the target resource is the first resource used to transmit the SL channel measurement reference signal, the SL information includes a channel state information reference signal.

In some embodiments, in the terminal device 400 in this embodiment of the present disclosure, the receiving module 401 may be further configured to:

receive target signaling transmitted by the first terminal device based on a second resource, where the target signaling includes at least one of CSI resource configuration signaling, CSI reporting configuration signaling, CSI triggering state configuration signaling, or CSI triggering signaling.

In some embodiments, in the terminal device 400 in this embodiment of the present disclosure, the sending module 403 may be configured to:

in a case that the feedback information includes channel state information CSI, transmit the feedback information to the first terminal device based on a third resource.

In some embodiments, in the terminal device 400 in this embodiment of the present disclosure, a frequency band on which at least one of the third resource, the second resource, or the first resource is located is specified in a protocol, preconfigured, or configured by a control node.

In some embodiments, in the terminal device 400 in this embodiment of the present disclosure, the feedback information carries a target indication field, and the target indication field is used to indicate an index of a frequency band on which at least one of the third resource, the second resource, or the first resource is located.

It can be understood that the terminal device 400 provided in this embodiment of the present disclosure can implement the sidelink information transmission information performed by the terminal device 400. Related descriptions of the method for sidelink information transmission are applicable to the terminal device 400, and details are not described herein again.

In this embodiment of the present disclosure, when the second terminal device performs information exchange transmission with the first terminal device by using the sidelink SL, the SL information transmitted by the first terminal device based on the target resource may be received. The target resource may include a resource set, that is, a group of resources, dedicated by the first terminal device to establish a reliable communication link with the second terminal device, or may further include an available resource that has provided a reliable communication link for information exchange between the first terminal device and the second terminal device, that is, the first resource used to transmit the SL channel measurement reference signal, and transmit the feedback information corresponding to the SL information to the first terminal device, to successfully implement information exchange transmission with the first terminal device, and to further implement corresponding information exchange based on specific content of the feedback information In this way, sidelink information transmission efficiency can be improved, and a phenomenon that a coverage area and spectrum utilization of high-frequency transmission are limited is effectively improved.

Figure 11:
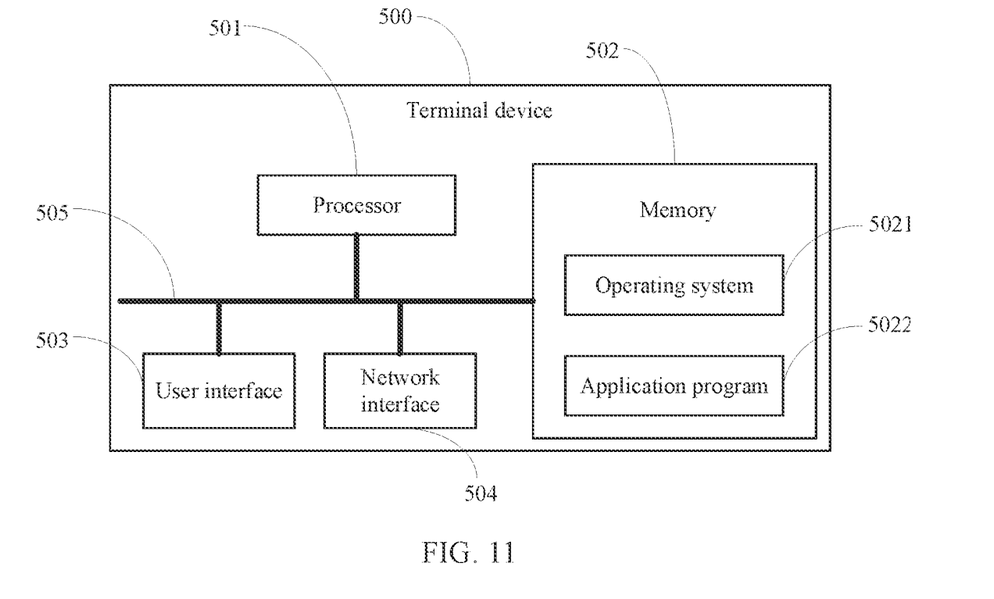
FIG. 11 is a schematic diagram of a structure of still another terminal device according to an embodiment of the present disclosure.

FIG. 11 is a block diagram of a terminal device according to another embodiment of the present disclosure. A terminal device 500 shown in FIG. 11 includes at least one processor 501, a memory 502, at least one network interface 504, and a user interface 503. Components in the terminal device 500 are coupled together by using a bus system 505. It may be understood that the bus system 505 is configured to implement connection and communication between these components. In addition to a data bus, the bus system 505 further includes a power bus, a control bus, and a status signal bus. However, for clear description, various buses are marked as the bus system 505 in FIG. 11.

The user interface 503 may include a display, a keyboard, or a click device (for example, a mouse, a trackball, a touchpad, or a touchscreen).

It may be understood that the memory 502 in this embodiment of the present disclosure may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. By way of example instead of limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 502 of the system and method described in the embodiments of the present disclosure is intended to include but is not limited to these and any other suitable type of memory.

In some implementations, the memory 502 stores the following elements: an executable module or a data structure, or a subset thereof, or an extension set thereof: an operating system 5021 and an application program 5022.

The operating system 5021 includes various system programs, such as a framework layer, a kernel layer, and a drive layer, and is configured to implement various basic services and process hardware-based tasks. The application program 5022 includes various application programs, such as a media player and a browser, and is configured to implement various application services. A program for implementing the method in the embodiments of the present disclosure may be included in the application program 5022.

In this embodiment of the present disclosure, the terminal device 500 further includes a computer program that is stored in the memory 502 and runs on the processor 501.

In some embodiments, when the computer program is executed by the processor 501, the following steps may be implemented:

transmitting SL information to a second terminal device on a sidelink SL based on a target resource, where the target resource includes a resource in a target resource set or a first resource used to transmit an SL channel measurement reference signal; and receiving feedback information transmitted by the second terminal device, where the feedback information corresponds to the SL information.

In embodiments of the present disclosure, when the first terminal device and the second terminal device perform information exchange transmission by using the sidelink SL, an SL resource allocation manner can be enriched by providing insurance for establishment of a reliable communication link between the first terminal device and the second terminal device by using a dedicated resource set, that is, a group of resources, or by using an available resource that has provided for a reliable communication link for information exchange between the first terminal device and the second terminal device, that is, the first resource used to transmit the SL channel measurement reference signal. Further, the SL information may be effectively and reliably transmitted to the second terminal device by using a target resource in any one of the foregoing forms, so that information exchange transmission with the second terminal device is successfully implemented after the feedback information corresponding to the SL information is received, and corresponding information exchange may be implemented based on specific content of the feedback information. In this way, sidelink information transmission efficiency can be improved, and a phenomenon that a coverage area and spectrum utilization of high-frequency transmission are limited is effectively improved.

In some embodiments, when the computer program is executed by the processor 501, the following steps may be further implemented:

receiving SL information transmitted by a first terminal device on an SL based on a target resource, where the target resource includes a resource in a target resource set or a first resource used to transmit an SL channel measurement reference signal; and transmitting feedback information transmitted to the first terminal device, where the feedback information corresponds to the SL information.

In this embodiment of the present disclosure, when the second terminal device performs information exchange transmission with the first terminal device by using the SL, the SL information transmitted by the first terminal device based on the target resource may be received. The target resource may include a resource set, that is, a group of resources, dedicated by the first terminal device to establish a reliable communication link with the second terminal device, or may further include an available resource that has provided a reliable communication link for information exchange between the first terminal device and the second terminal device, that is, the first resource used to transmit the SL channel measurement reference signal, and transmit the feedback information corresponding to the SL information to the first terminal device, to successfully implement information exchange transmission with the first terminal device, and to further implement corresponding information exchange based on specific content of the feedback information. In this way, sidelink information transmission efficiency can be improved, and a phenomenon that a coverage area and spectrum utilization of high-frequency transmission are limited is effectively improved.

The foregoing method disclosed in the embodiments of the present disclosure may be applied to the processor 501, or implemented by the processor 501. The processor 501 may be an integrated circuit chip, and has a signal processing capability. In an implementation process, the steps in the foregoing methods may be completed by using an integrated logic circuit of hardware in the processor 501 or an instruction in a form of software. The foregoing processor 501 may be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure may be implemented or executed. The general purpose processor may be a microprocessor, or the processor may be any conventional processor or the like. The steps of the method disclosed with reference to the embodiments of the present disclosure may be directly performed by a hardware decoding processor, or may be performed by using a combination of hardware and software modules in a decoding processor. The software module may be located in a non-transitory computer-readable storage medium that is mature in the art, such as a random access memory, a flash memory, a read-only memory, a programmable read-only memory, an electrically erasable programmable memory, or a register. The non-transitory computer-readable storage medium is located in the memory 502. The processor 501 reads information in the memory 502 and completes the steps of the foregoing methods in combination with the hardware of the processor 501. The non-transitory computer-readable storage medium stores a computer program. When the computer program is executed by the processor 501, steps in the foregoing method for sidelink information transmission embodiment are implemented.

It may be understood that the embodiments described in the embodiments of the present disclosure may be implemented by hardware, software, firmware, middleware, microcode, or a combination thereof. For hardware implementation, the processing unit may be implemented in one or more Application Specific Integrated Circuits (ASIC), a Digital Signal Processing (DSP), a DSP Device (DSPD), a Programmable Logic Device (PLD), a Field-Programmable Gate Array (FPGA), a general purpose processor, a controller, a microcontroller, a microprocessor, another electronic unit configured to perform the functions described in the present disclosure, or a combination thereof.

For software implementations, the techniques described in embodiments of the present disclosure may be implemented by modules (for example, processes or functions) that perform the functions described in the embodiments of the present disclosure. The software code may be stored in a memory and executed by a processor. The memory may be implemented in or outside the processor.

The terminal device 500 can implement processes implemented by the terminal device in the foregoing method embodiments. To avoid repetition, details are not described herein again.

An embodiment of the present disclosure further provides a terminal device, including a processor, a memory, and a computer program that is stored in the memory and that can run on the processor. When the computer program is executed by the processor, the process of the method for sidelink information transmission in the embodiment shown in FIG. 2 or FIG. 3 is implemented, and a same technical effect can be achieved. To avoid repetition, details are not described herein.

An embodiment of the present disclosure further provides a non-transitory computer-readable storage medium. A computer program is stored in the non-transitory computer-readable storage medium. When being executed by a processor, the process of the method for sidelink information transmission in the embodiment shown in FIG. 2 or FIG. 3 is implemented, and a same technical effect can be achieved. To avoid repetition, details are not described herein. The non-transitory computer-readable storage medium includes a Read-Only Memory (ROM), a Random Access Memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A method for sidelink (SL) information transmission, performed by a first terminal device, comprising:
   transmitting SL information to a second terminal device on an SL based on a target resource, wherein the target resource comprises a resource in a target resource set or a first resource used to transmit an SL channel measurement reference signal; and
   receiving feedback information transmitted by the second terminal device on a reporting resource, wherein the feedback information corresponds to the SL information, and the reporting resource is not configured by the first terminal device but independently selected by the second terminal device,
   wherein the target resource set and a target sidelink synchronization signal block (S-SSB) are in a frequency division multiplexing or time division multiplexing relationship, and a transmission manner corresponding to the target S-SSB is different from a transmission manner corresponding to each resource in the target resource set.

2. The method according to claim 1, wherein when the target resource is a resource in the target resource set,
   the target resource set is specified in a protocol, preconfigured, or configured by a control node; or
   the target resource set is determined based on selection of the first terminal device or scheduling of a control node.

3. The method according to claim 2, further comprising:
   determining, in a manner of being specified in a protocol, being preconfigured, or being configured by a network device, a first configuration parameter related to the target resource set;
   wherein the first configuration parameter comprises at least one of the following:
   a period corresponding to the target resource set;
   an offset corresponding to the target resource set;
   a length or a quantity of time domain transmission units corresponding to the target resource set; or
   a frequency domain resource configuration parameter corresponding to the target resource set.

4. The method according to claim 2, further comprising:
   determining, in a manner of being indicated by physical layer signaling, a second configuration parameter related to the target resource set;
   wherein the second configuration parameter comprises at least one of the following:
   an index corresponding to the target resource set, wherein the index is used to identify the target resource set;
   an indicator corresponding to the target resource set, wherein the indicator is used to indicate that the SL transmission is performed based on the target resource set; or
   an index corresponding to each resource in the target resource set.

5. The method according to claim 2, wherein the first terminal device is specified in a protocol, preconfigured, or configured by a network device.

6. The method according to claim 2, further comprising:
   determining, in a manner of being indicated by physical layer signaling, a third configuration parameter related to the target resource set;

wherein the third configuration parameter comprises at least one of the following:
a period corresponding to the target resource set;
a length or a quantity of time domain transmission units corresponding to the target resource set;
an index corresponding to the target resource set, wherein the index is used to identify the target resource set;
an indicator corresponding to the target resource set, wherein the indicator is used to indicate that the SL transmission is performed based on the target resource set; or
an index corresponding to each resource in the target resource set.

7. The method according to claim 2, wherein when there are multiple resources in the target resource set, the multiple resources have a same resource block size.

8. The method according to claim 2, wherein when there are multiple resources in the target resource set, the multiple resources are consecutive.

9. The method according to claim 2, wherein the transmitting SL information to a second terminal device on an SL based on a target resource comprises:
SL information transmitted on the SL to the second terminal device based on resources in the target resource set includes same data.

10. The method according to claim 2, wherein the SL information comprises an SL measurement reporting configuration parameter, and the SL measurement reporting configuration parameter comprises at least one of the following:
a reporting triggering identifier;
a reporting type; or
a reporting resource.

11. The method according to claim 1, wherein when the target resource is the first resource used to transmit the SL channel measurement reference signal, the SL information comprises a channel state information reference signal.

12. The method according to claim 11, further comprising:
transmitting target signaling to the second terminal device based on a second resource, wherein the target signaling comprises at least one of Channel State Information (CSI) resource configuration signaling, CSI reporting configuration signaling, CSI triggering state configuration signaling, or CSI triggering signaling.

13. The method according to claim 12, wherein the feedback information comprises CSI, and the receiving feedback information transmitted by the second terminal device comprises:
receiving the feedback information transmitted by the second terminal device based on a third resource.

14. The method according to claim 13, wherein the target signaling carries a target indication field, and the target indication field is used to indicate an index of a frequency band on which at least one of the third resource, the second resource, or the first resource is located.

15. The method according to claim 12, wherein when the target signaling comprises CSI triggering signaling, a second resource corresponding to the CSI triggering signaling is fixed in size, and is specified in a protocol, preconfigured, or configured by a control node; and
the size of the second resource corresponding to the CSI triggering signaling comprises one of the following:
one or more subchannels;
one or more physical resource blocks (PRBs);
one or more slots;
one or more sub-slots; or
one or more standalone physical sidelink control channels (PSCCH).

16. A first terminal device, comprising:
a memory storing a computer program; and
a processor coupled to the memory and configured to execute the computer program to perform a method for sidelink (SL) information transmission, the method comprising:
transmitting SL information to a second terminal device on an SL based on a target resource, wherein the target resource comprises a resource in a target resource set or a first resource used to transmit an SL channel measurement reference signal; and
receiving feedback information transmitted by the second terminal device on a reporting resource, wherein the feedback information corresponds to the SL information, and the reporting resource is not configured by the first terminal device but independently selected by the second terminal device,
wherein the target resource set and a target sidelink synchronization signal block (S-SSB) are in a frequency division multiplexing or time division multiplexing relationship, and a transmission manner corresponding to the target S-SSB is different from a transmission manner corresponding to each resource in the target resource set.

17. The first terminal device according to claim 16, wherein when the target resource is a resource in the target resource set,
the target resource set is specified in a protocol, preconfigured, or configured by a control node; or
the target resource set is determined based on selection of the first terminal device or scheduling of a control node.

18. The first terminal device according to claim 16, wherein when the target resource is the first resource used to transmit the SL channel measurement reference signal, the SL information comprises a channel state information reference signal.

19. A non-transitory computer-readable storage medium, storing a computer program, when the computer program is executed by a processor of a first terminal device, performs a method for sidelink (SL) information transmission, the method comprising:
transmitting SL information to a second terminal device on an SL based on a target resource, wherein the target resource comprises a resource in a target resource set or a first resource used to transmit an SL channel measurement reference signal; and
receiving feedback information transmitted by the second terminal device on a reporting resource, wherein the feedback information corresponds to the SL information, and the reporting resource is not configured by the first terminal device but independently selected by the second terminal device,
wherein the target resource set and a target sidelink synchronization signal block (S-SSB) are in a frequency division multiplexing or time division multiplexing relationship, and a transmission manner corresponding to the target S-SSB is different from a transmission manner corresponding to each resource in the target resource set.

* * * * *